United States Patent [19]

Hyodo

[11] 4,381,053
[45] Apr. 26, 1983

[54] CABLE-TYPE CLUTCH RELEASE DEVICE FOR USUALLY CONTACTING-TYPE CLUTCH

[75] Inventor: Youichi Hyodo, Okazaki, Japan

[73] Assignee: Toyota Jidosha Kogyo Kabushiki Kaisha, Toyota, Japan

[21] Appl. No.: 197,148

[22] Filed: Oct. 15, 1980

[30] Foreign Application Priority Data

Oct. 26, 1979 [JP] Japan ............... 54-147630[U]
Nov. 26, 1979 [JP] Japan ............... 54-162736[U]
Jul. 16, 1980 [JP] Japan ............... 55-99326[U]

[51] Int. Cl.³ ............................................. F16D 13/75
[52] U.S. Cl. ........................... 192/111 A; 192/30 V; 192/99 S
[58] Field of Search ............ 192/111 A, 30 V, 99 S, 192/70.25; 188/196 B, 71.8, 79.5 S; 74/501.5, 512, 533

[56] References Cited

U.S. PATENT DOCUMENTS

| 2,036,004 | 3/1936 | Wemp | 192/111 A |
| 3,565,223 | 2/1971 | Pierce | 192/30 V |
| 4,181,209 | 1/1980 | Wheaton | 188/71.8 |
| 4,227,603 | 10/1980 | Fasano | 192/111 A |
| 4,263,999 | 4/1981 | Fasano | 192/111 A |
| 4,310,086 | 1/1982 | Mochida | 192/111 A |

FOREIGN PATENT DOCUMENTS 2449434  4/1975  Fed. Rep. of Germany ... 192/111 A

Primary Examiner—Rodney H. Bonck
Attorney, Agent, or Firm—Finnegan, Henderson, Farabow, Garrett & Dunner

[57] ABSTRACT

There is disclosed a cable-type clutch release device for a clutch of the type, in which a release bearing disposed between a crank shaft of an engine and a transmission is maintained in contact with a diaphragm spring when the clutch pedal is released. In the clutch release device according to the present invention, a first clutch pedal member having a pedal pad, a second clutch pedal member, and a ratchet member connected to one end of a cable for transmitting the movement of the first clutch pedal member to the clutch, and having ratchet teeth are supported pivotally movably about a common axis; and a pawl member having at one end thereof a pawl engageable with one of ratchet teeth of the ratchet member is pivotally movably supported on the second clutch pedal member, the other end of the pawl member being adapted to engage an engaging pin. Furthermore, the clutch release device of the invention comprises; a first spring for biasing the first clutch pedal member in a direction of a return movement, a second spring for biasing the second clutch pedal member in a direction of return movement, and a third spring for biasing the pawl member in a manner that the pawl of the pawl member can engage one of the ratchet teeth of the ratchet member.

11 Claims, 12 Drawing Figures

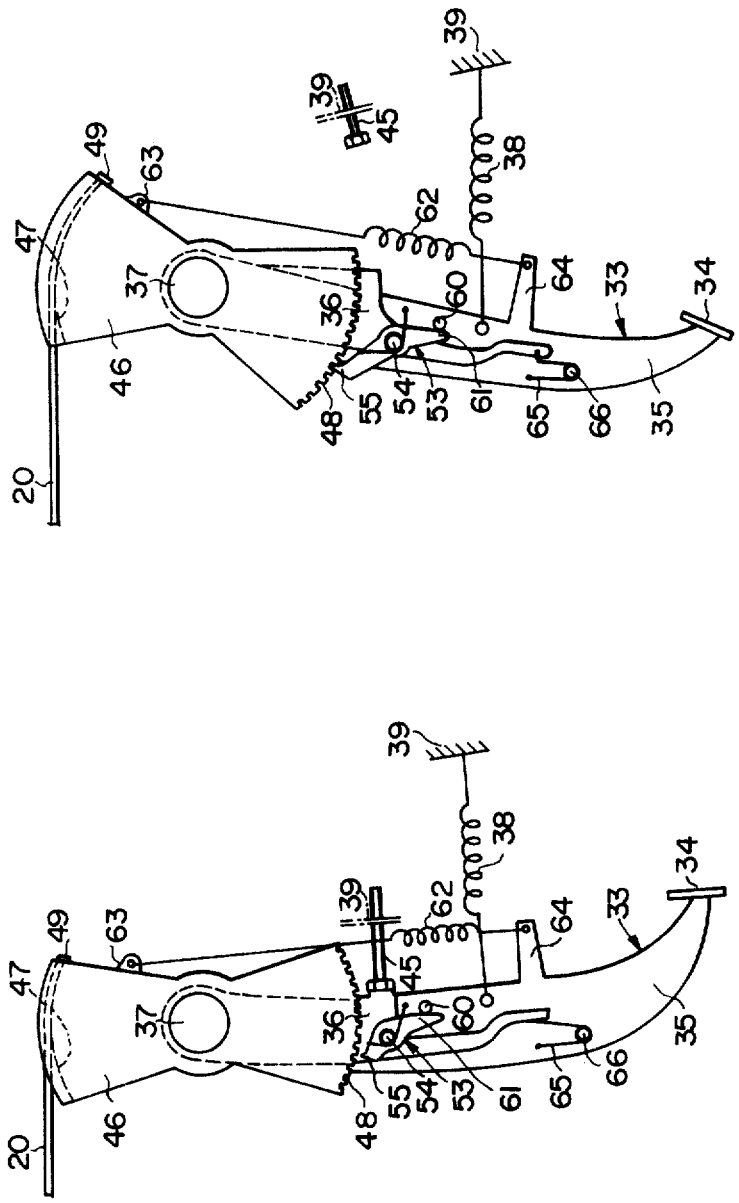

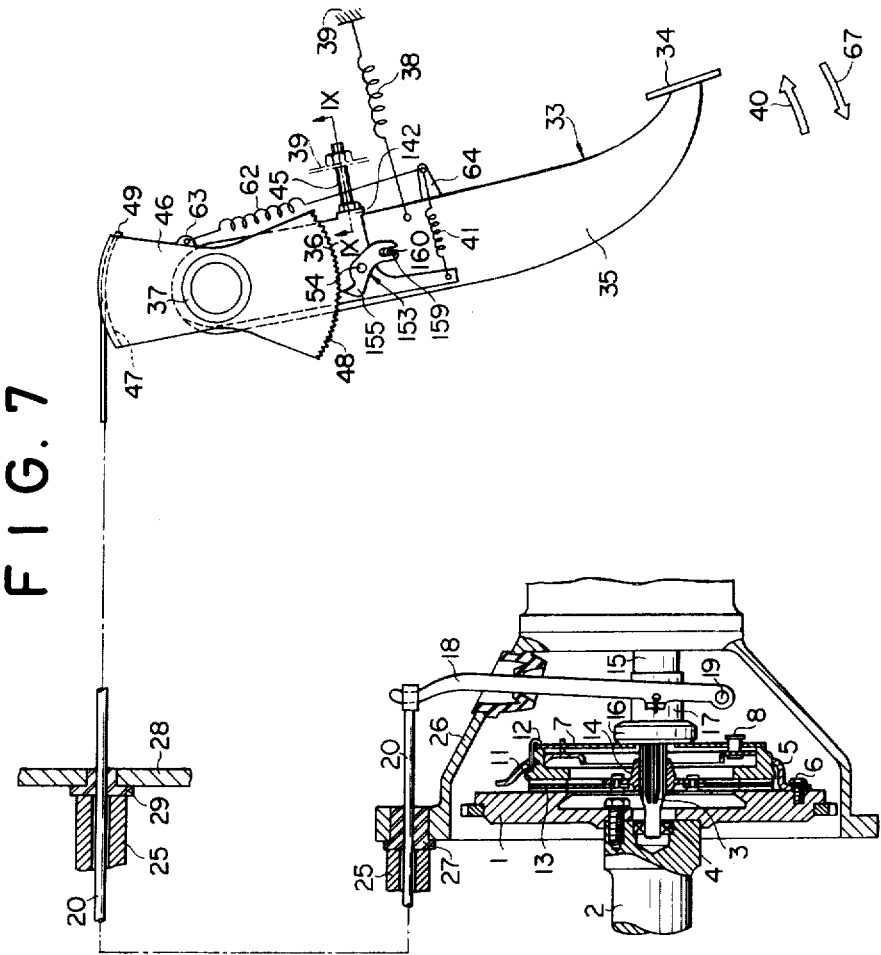

F I G. 8
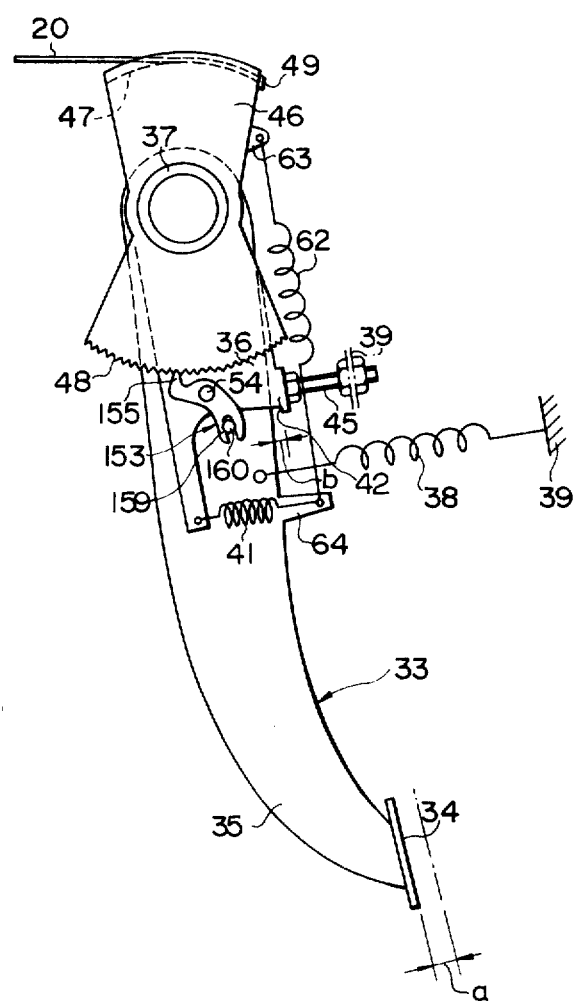

and the pawl member at a time of its engagement with one of the ratchet teeth.

CABLE-TYPE CLUTCH RELEASE DEVICE FOR USUALLY CONTACTING-TYPE CLUTCH

BACKGROUND OF THE INVENTION

This invention relates to a cable-type clutch release device for a usually contacting-type clutch, in which a diaphragm spring of a clutch and a release bearing are usually maintained in contact with each other, and movement of a clutch pedal is transmitted by way of a cable to a release fork.

In a conventional clutch provided between an engine and a transmission, it is usual that a length of a cable is unvariable. For this reason, due to wear taking place in a clutch disc, a change in a clearance of a clutch pedal is bound to result.

SUMMARY OF THE INVENTION

It is a primary object of the present invention to provide a cable-type clutch release device for a usually contacting-type clutch, wherein the device is self-adjusted so that a clearance of a clutch pedal is usually maintained constant, irrespective of a wear taking place in a clutch disc.

It is a secondary object of the present invention to provide a cable-type clutch release device of the type described above, wherein generation of abnormal sound is prevented.

It is a third object of the present invention to provide a cable-type clutch release device of the type described above, wherein the stagger in an axial direction of pivotal movement, in engagement between a pawl and a ratchet tooth is effectively prevented.

To attain the first object, there is provided according to the present invention a cable-type clutch release device, which comprises a first clutch pedal member pivotally movably supported on a vehicle body and having a pedal pad at the lower end thereof; a second clutch pedal member supported pivotally movably about the axis of rotation of the first clutch pedal member; a first spring for biasing the first clutch pedal member in a direction of a return movement thereof; a second spring for biasing the second clutch pedal member in a direction of its return movement; a stopper for limiting the return movements of the first and second clutch pedal members; a ratchet member having ratchet teeth and supported pivotally movably about the axis of rotation of the first clutch pedal member, the ratchet member having thereon the other end of a cable secured thereto; a pawl member having at one end thereof a pawl adapted to engage one of the ratchet teeth, and pivotably movably supported on the second clutch pedal member; a third spring for biasing the pawl member in a direction to disengage its pawl from the ratchet teeth; and an engaging member provided on the first clutch pedal member and engageable with the other end of the pawl member.

When the first clutch pedal member is released, the pawl of the pawl member disengages from one of the ratchet teeth by the action of the third spring, and connection of the cable to the first clutch pedal member is interrupted. As a result, the release bearing becomes displaced in proportion to a degree of wear taking place in the clutch disc, and the position of the ratchet teeth of the pivotally moveable ratchet member is adjusted according to a degree of wear in the clutch disc. Adjustment in position of the ratchet teeth is equivalent to self-adjustment of the length of the cable, particularly, an inner cable.

When the first clutch pedal member is depressed for the purpose of releasing the clutch, the second spring acts to cause the relative movement between the first and second clutch pedal members, and as the relative movement progresses, the engaging member urges the pawl member against the force of the third spring. When the first clutch pedal member has been depressed by a degree equivalent to a predetermined clearance, the pawl is brought into engagement with one of the ratchet teeth. After the engagement between the pawl member and the ratchet tooth, the movement of the first clutch pedal member in a direction to be depressed is transmitted by way of the cable to the release bearing. The clearance of the first clutch pedal member may thus be maintained constant independently of wear in the clutch disc.

The second spring is preferably a tension spring or a torsion spring fixed at the opposite ends thereof to given points on the first and second clutch pedal members, respectively.

To attain the secondary object, there is provided a cable-type clutch release device, wherein a release bearing is usually in contact with a diaphragm spring adapted to urge a clutch disc serving as one clutch member to be connected, through the medium of a pressure plate, against the other clutch member; and which comprises a clutch pedal having first and second clutch pedal members and operating the axial position of the release bearing by way of the cable; a pivotally movable ratchet member connected to the end of the cable which is on the clutch pedal side, and having ratchet teeth; a pawl member having at one end thereof a pawl engageable with one of the ratchet teeth of the ratchet member and pivotally supported on the second clutch pedal member; and an engaging member adapted to engage the other end of the pawl member and provided on the first clutch pedal member, the second clutch pedal member having engaging portions engageable with a stopper provided on a vehicle body and receiving the end on the return stroke side, of the first clutch pedal member. By virtue of the action of the resilient member, the direct contact between the first and second clutch pedal members, which are made of metal, is avoided, thus eliminating generation of abnormal sound.

The resilient member is preferably attached to the second clutch pedal member in a manner to embrace two engaging portions of the second clutch pedal member.

Only a single resilient member is used in common to two engaging portions, for preventing generation of abnormal sound, with the result of reduction in number of parts and an increased efficiency in assembling work.

To attain the third object, there is provided according to the present invention a cable-type clutch release device characterized in that a point at which a spring for preventing the cable from being slackened is attached to a ratchet member and a point at which the spring is attached to the first clutch pedal member are displaced from each other in a direction of the axis of pivotal movement of the first clutch pedal member; and there is provided a locating means for retaining at given values a distance in the direction of the axis of pivotal movement of the first clutch pedal member between the ratchet member and the second clutch pedal member and a distance between the second clutch pedal member and the first clutch pedal member, respectively.

The first clutch pedal member and the ratchet member are mutually urged by the spring toward the axis of pivotal movement of the first clutch pedal member, and the distance between the first and second clutch pedal members and the distance between the second clutch pedal member and the ratchet member are properly defined by the locating means, whereas the stagger in engagement of the pawl with one of the ratchet teeth is avoided.

The locating means between the ratchet member and the second clutch pedal member may be a raised portion formed on the side surface of the ratchet member, which faces the second clutch pedal member, and the locating member between the second clutch pedal member and the first clutch pedal member may be a bushing mounted on the second clutch pedal member.

Those and other objects and features of the present invention will be apparent from the ensuing part of the specification in conjunction with the drawings which indicate preferred embodiments of the invention.

BRIEF DESCRIPTION OF THE DRAWINGS

FIG. 2 illustrates the positional relationship among respective components when the clutch pedal is depressed by a distance equivalent to a clearance a;

FIGS. 5 and 6 illustrate the positional relationship among respective components when the clutch pedal is released and depressed respectively;

FIG. 7 is a modified cable-type clutch release device including an abnormal sound preventing means;

FIG. 8 illustrates the positional relationship among associated components when the clutch pedal of FIG. 7 is depressed by a distance equivalent to a clearance a;

FIG. 11 illustrate the positional relationship among associated components when the clutch pedal in the device of FIG. 10 is depressed by a distance equivalent to a clearance a;

DESCRIPTION OF THE PREFERRED EMBODIMENTS

Figure 1:
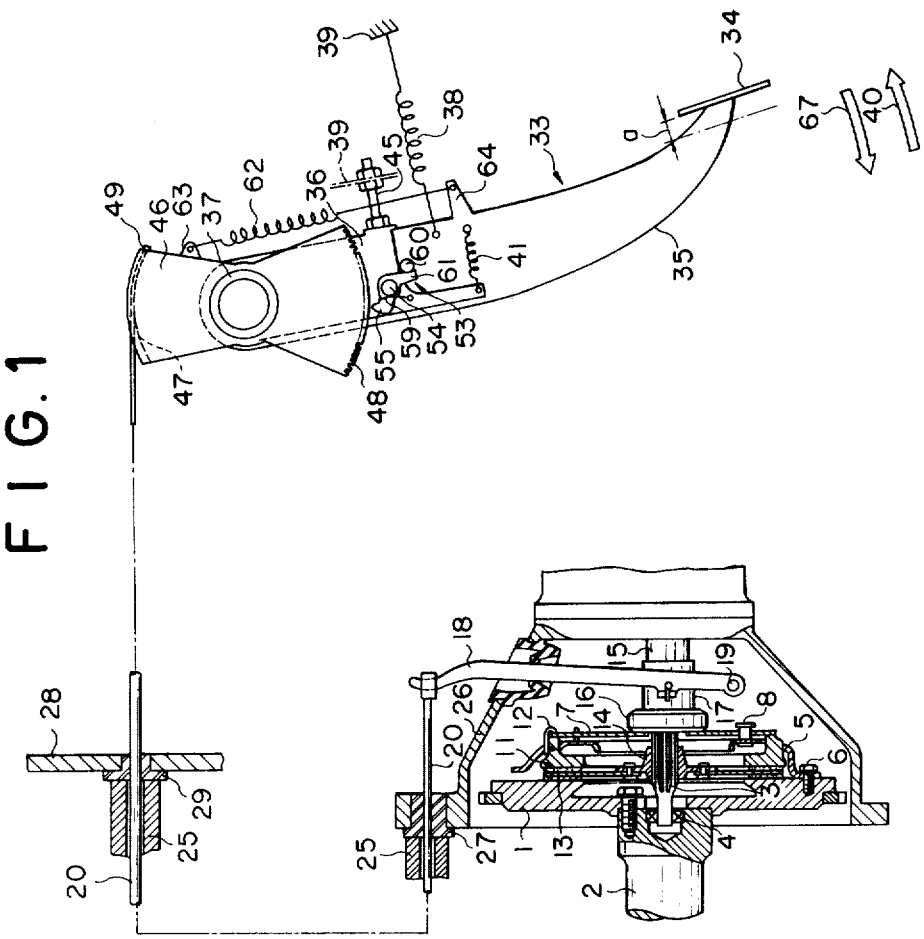
FIG. 1 is a schematic view of a cable-type clutch release device shown in the clutch-released mode.

Referring first to FIG. 1, a fly wheel 1 is mounted on a crank shaft 2 of an engine (not shown) and relatively rotatably supported through the medium of a pilot bearing 4 on an input shaft 3 of a transmission (not shown). A clutch cover 5 is bolted as at 6 to the fly wheel 1. A diaphragm spring 7 is supported at predetermined points thereof on the clutch cover 5 by means of pivot rings 8. A pressure plate 11 is supported at predetermined points in the outer peripheral portion thereof on the clutch cover 5 through the medium of straps (not shown) and coupled by retracting springs 12 to the outer circumferential edge of the diaphragm spring 7. A clutch disc 13 is mounted on a hub 14 between the fly wheel 1 and the pressure plate 11, which hub is in turn spline-fitted on the shaft 3. Extending in alignment with the input shaft 3 is a cylindrical bearing retainer 15, on which is axially slidably mounted a clutch release bearing hub 17, on which is mounted a clutch release bearing 16 acting in engagement on the central portion of the diaphragm spring 7. A release fork 18 is pivotally movably supported at one end by a shaft 19, coupled at the mid point thereof to the release hub 17, and has an inner cable 20 secured at the other end thereof. An outer cable 25 covering the inner cable 20 abuts at one end thereof on a bushing 27 fitted on a clutch housing 26, and at the other end thereof on a bushing 29 fitted in a dash panel 28.

A clutch pedal 33 comprises a first clutch pedal member 35 having a pedal pad 34 at the lower end thereof and a second clutch pedal member 36. The first and second clutch pedal members 35 and 36 are pivotally movably supported by a pedal boss 37, which in turn is attached to a vehicle body. A return spring 38 serving as a tension spring is secured at the opposite ends thereof to the first clutch pedal member 35 and the vehicle body 39, respectively, so as to bias the first clutch pedal member 35 in a direction of return movement thereof. A spring 41 serving as a tension spring is secured at the opposite ends thereof to the first and second clutch pedal members 35 and 36, respectively, so as to bias the second clutch pedal member 36 in a direction of return movement thereof. A pedal stopper 45 adjustable in a degree of protrusion is secured to the body 39 and adapted to engage the first and second clutch pedal members 35 and 36, thereby limiting the return movements of these members. A sector 46 is pivotally movably supported by the pedal boss 37 and has a cable guide 47 in one circumferential portion thereof and ratchet teeth 48 at the other circumferential edge. The inner cable 20 pierces through the dash panel 28 to be secured to one end 49 of the cable guide 47. A pawl member 53 is pivotally movably supported on the second clutch pedal member 36 and has at one end thereof a pawl 55 engageable with one of the ratchet teeth 48. A spring 59 is wound about a pin 54 in a manner to bias the pawl member 53 in a direction to disengage the pawl from one of the ratchet teeth 48. An engaging pin 60 is attached to the first clutch pedal member 35 engageably with the other end 61 of the pawl member 53. A tension spring 62 is secured at one end thereof to a lug 63 of the sector 46 and at the other end thereof to a lug 64 of the first clutch pedal member 35, so as to prevent the inner cable from being slackened.

Figure 2:
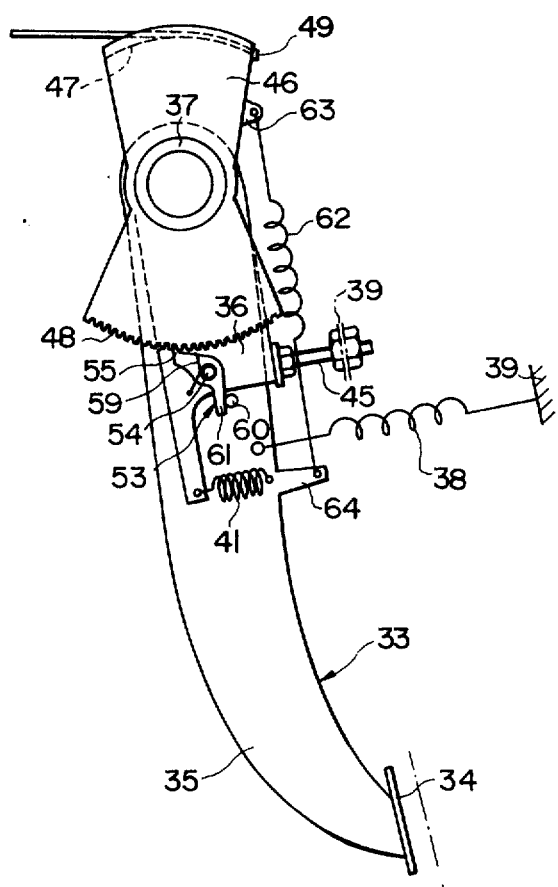

When the pedal pad 34 is depressed, the first clutch pedal member 35 is turned about the pedal boss 37 in a direction of being trodden or depressed 67. Despite the movement in the direction of being trodden 67, of the first clutch pedal member 35, the second clutch pedal member 36 is maintained in engagement with the pedal stopper 45 by the tension of the spring 41. Consequently, the relative movement between the first and second clutch pedal members 35 and 36 is caused, so that the other end of the pawl member 53 is moved clockwise against the force of the spring 59 by the engaging pin 60 of the first clutch pedal member 35. When the first clutch pedal member 35 is depressed by a degree equivalent to a given clearance a (FIG. 2), the pawl 55 of the pawl member 53 engages one of the ratchet teeth 48. After the pawl 55 has been brought into engagement with one of the ratchet teeth 48, the first and second clutch pedal members 35,36, and the sector 46 are integrally turned about the pedal boss 37 as the first clutch pedal member 35 is depressed degree by degree, and with increase in a degree of the clutch pedal being depressed, the inner cable 20 is pulled toward the clutch pedal 33, whereby the release bearing 16 presses the central portion of the diaphragm spring 7 toward the fly wheel 1, thereby disengaging the pressure plate 11 from the fly wheel 1, whereby the clutch is released.

Figure 3:
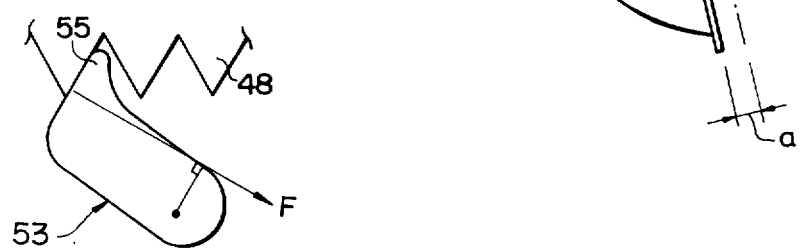
FIG. 3 is an enlarged view of a self-lock mechanism which is to be omitted in the release device according to the present invention.

The engagement of the pawl 55 with one of the ratchet teeth 48 is maintained by the other end of the pawl member 53 biased by the engaging pin 60 integral with the first clutch pedal member 35, throughout the duration which the first clutch pedal member 35 is being depressed. After the pawl 55 has engaged one of the ratchet teeth 48, the reaction force from the ratchet member 48 is exerted on the pawl 55. The reaction force exerts on the pawl member 53 a rotational moment in a direction to disengage the pawl 55 from one of the ratchet teeth 48, depending on a configuration of ratchet teeth and that of the pawl 55 as well as the positional relationship of the reaction force to the pin 54. In the ordinary ratchet mechanism, sizes and shapes of the ratchet 48 and the pawl 55 must be taken into consideration, so that the reaction force from the ratchet 48 may act on the pawl member 53 as a rotational moment in a direction to promote engagement between the pawl 55 and the ratchet 48 (clockwise movement in FIG. 3) during the movement of depression. In the ordinary self-locking structure, the pawl 55 and the ratchet 48 have suffered from wear due to contact therebetween when the pawl engages or disengages from the ratchet 48. In contrast thereto, even when the reaction force F acts on the pawl member 53 as a moment of counterclockwise movement in FIGS. 1 and 2, the pivotal movement in the direction to disengage from the ratchet, of the pawl member 53 is impeded by the engaging pin 60, and hence a self-locking mechanism having a center of rotation at the shaft 54 can be omitted according to the present invention.

Since the engagement of the pawl 55 with one of the ratchet teeth 48 is maintained for the initial duration on the return stroke of the clutch pedal 33, then the first and second clutch pedal members 35,36 and the sector 46 are integrally turned about the pedal boss 37 in the direction of return movement, thereby displacing the release bearing 16 in a direction of being detached from the fly wheel 1. The second clutch pedal member 36 is moved earlier in the direction of return movement by an angle b corresponding to the clearance a than the first clutch pedal member 35 (FIG. 2), then the second clutch pedal member 36 engages the pedal stopper 45 earlier than the first clutch pedal member 35 does. Since the rotational moment exerted by the return spring 38 on the first clutch pedal member 35 is larger than that from the spring 41, the first clutch pedal member 35 is pulled by the return spring 38 against the force of the return spring 41 to move by a distance equivalent to the clearance a into engagement with the pedal stopper 45 (FIG. 1). The movement of the first clutch pedal member 35, namely, the engaging pin 60, for a duration equivalent to the clearance a causes the counterclockwise movement of the pawl member 53 as viewed in FIG. 1, whereas the pawl member 53 is turned by the spring 59, thereby disengaging the pawl 55 from one of the ratchet teeth 48. When the clutch pedal 33 assumes the terminal point on the return stroke, the connection between the clutch pedal 33 and the inner cable 20 is broken, thus permitting the release bearing 16 to detach from the fly wheel 1 according to a degree of wear in the clutch disc 13. When the clutch is in engagement, the release bearing 16 is pressed against the fly wheel 1 under a proper pressure by the diaphragm spring 7, irrespective of a degree of wear in the clutch disc 13.

In proportion to a degree of wear in the clutch disc 13, the inner cable 20 is pulled toward the clutch, and a point to which the sector member 46 is turned changes. The pawl 55, on the subsequent depression stroke of the clutch pedal 33, engages a different tooth of the ratchet 48 according to the point to which the sector member 46 has been turned, which point is dependent on a degree of wear in the clutch disc 13. Stated otherwise, there is obtained the same effect as a size of the inner cable exposed from the outer cable 23 increases in proportion to wear in the clutch disc 13.

Figure 4:
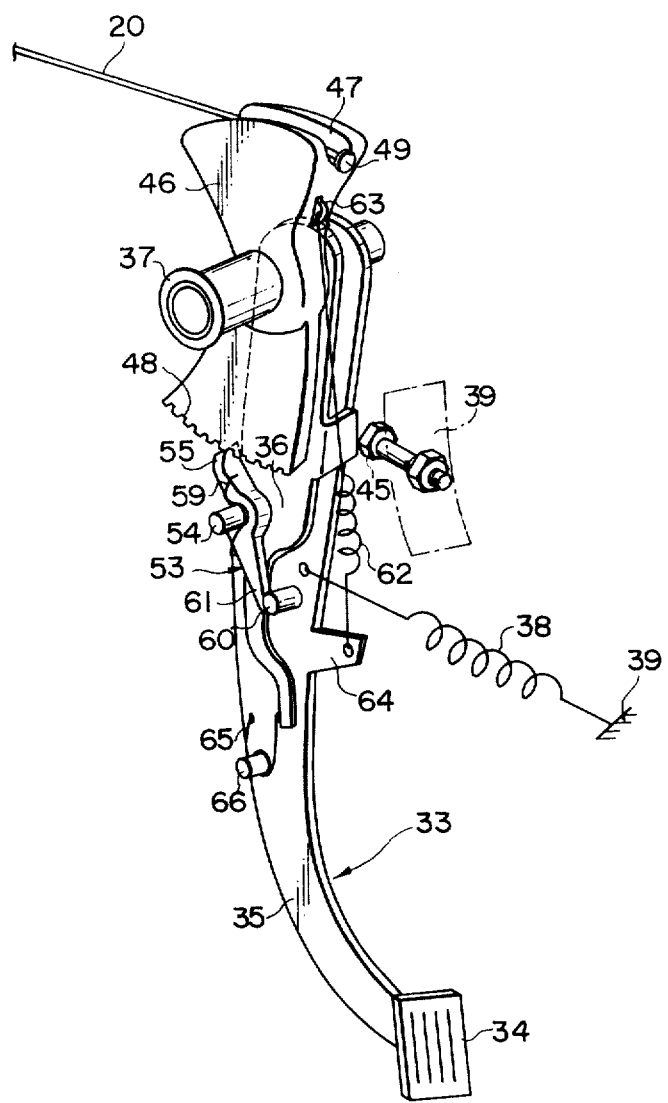
FIG. 4 is a perspective view of a clutch release device according to another embodiment of the invention.

FIGS. 4 through 6 illustrate another embodiment of the invention, wherein FIG. 4 is a perspective view, FIGS. 5 and 6 illustrate the positional relationship among associated members when the clutch pedal 33 is released and depressed, respectively. In the former embodiment, the tension spring 41 is employed as a means for pressing the second clutch pedal member 36 against the pedal stopper 45. In contrast thereto, a torsion spring 65 is wound to the pin 66 on the first clutch pedal member 35, so as to bias the second clutch pedal member 36 toward the pedal stopper 45. On the depression stroke of the clutch pedal, the opening between the opposite ends of the spring 65 is compressed, so that a relative movement through an angle b corresponding to the clearance a between the first and second clutch pedal members 35 and 36 is caused, and thereafter, the pawl 55 engages one of the ratchet teeth 48.

According to the second embodiment of the invention, when the clutch pedal is released, connection between the clutch pedal 33 and the inner cable 20 is broken, and the release bearing 16 can be displaced in proportion to a degree of wear in the clutch disc 13. The rotational position of the sector 46, namely, a tooth of the ratchet teeth 48 with which the pawl engages is adjusted in proportion to a degree of wear in the clutch disc 13. A change in a tooth of the ratchet teeth with which the pawl engages in association with a degree of wear in the clutch disc 13 is equivalent to the self-adjustment in a length of the inner cable 20. When the clutch pedal is depressed, the relative movement between the first and second clutch pedal members 35 and 36 is caused by the spring 41 or 65. As the relative movement progresses, the engaging pin 60 turns the pawl member 53, and the pawl 55 engages one of the ratchet teeth 48 when a degree of the first clutch pedal member being depressed reaches a predetermined clearance a. The movement on the depression stroke of the clutch pedal 33 is thus transmitted to the inner cable. The clearance a of the clutch pedal 33 can be thus maintained usually constant, irrespective of a degree of wear in the clutch disc 13.

FIG. 7 illustrates a cable-type clutch release device including an abnormal sound preventive means. The components common to those in the device of the first embodiment are shown by the same reference numerals, and no further description is given thereto.

The pawl member 153 is pivotally movably supported by the pin 54 on the second clutch pedal member 36, and has at the upper end thereof a pawl 155 engageable with one of the ratchet teeth 48 and a downwardly open groove 159 at the lower end thereof. A hauling pin 160 is secured on the first clutch pedal member 35 and fitted into the groove 159. When the clutch pedal 33 is in the released state (FIG. 7), the pawl 155 remains disengaged from the ratchet 48.

In operation, when the pedal pad 34 is trodden, the first clutch pedal member 35 is pivotally moved about the pedal boss 37 in the direction of being depressed. Despite the movement in the direction of depression 67, of the first clutch pedal member 35, the second clutch pedal member 36 is maintained in engagement with the pedal stopper 45 by the force of the tension spring 41. Consequently, the relative movement of the first clutch pedal member to the second clutch pedal member is caused, whereby the other end of the pawl member 155 is hauled by the hauling pin 160 fitted into the groove 159, thereby being turned clockwise, as viewed in FIG. 7. When a degree of the first clutch pedal member 35 being trodden reaches a predetermined clearance a (when the first pedal member 35 is depressed by a degree equivalent to a predetermined clearance a (FIG. 8), then the pawl 155 of the pawl member 153 engages one of the ratchet teeth 48. After engagement of the pawl 155 with one of the ratchet teeth 48, the first and second clutch pedal members 35 and 36 and the sector member 46 are pivotally moved integrally about the pedal boss 37 as the first clutch pedal member 35 is depressed to a further extent, and the inner cable 20 is pulled toward the clutch pedal 33, as a degree of the clutch pedal 33 being depressed is increased, whereby the release bearing 16 urges the central portion of the diaphragm spring 7 against the fly wheel 1, whereby the pressure plate 11 detaches from the fly wheel 1, thereby releasing the clutch.

On the return stroke of the clutch pedal 33, engagement of the pawl 155 with one of the ratchet teeth 48 is maintained during the initial stage, whereas the first and second clutch pedal members 35,36 and the sector member 46 are integrally turned about the pedal boss 37 in the direction of return movement 40, and the release bearing 16 is displaced in a direction to be away from the fly wheel 1. Since the second clutch pedal member 36 is moved in the direction of return movement earlier by an angle b corresponding to the clearance a than the first clutch pedal member 35 (FIG. 8), the engaging portion 142 of the second clutch pedal member 36 engages the pedal stopper 45 earlier than the first clutch pedal member 35. Since the rotational moment exerted by the return spring 38 on the first clutch pedal member 35 is larger than that from the return spring 41, then the first clutch pedal member 35 is pulled by the return spring 38 against the force of the return spring 41, and moved by a distance equal to the clearance a into the engagement with the pedal stopper 45 through the medium of the engaging portion 142 of the second clutch pedal member 36 (FIG. 7). Displacement of the first clutch pedal member 35, namely, the displacement of the hauling pin 160, for a duration equivalent to the clearance a, causes the pawl member 153 to pivotally move counterclockwise, thereby disengaging the pawl 155 from the ratchet tooth 48. At the terminal point on the return stroke of the clutch pedal 33, the inner cable 20 is disconnected from the clutch pedal 33, whereas the release bearing 16 can detach from the fly wheel 1, according to a degree of wear in the clutch disc 13, and irrespective of the wear in the clutch disc 13, a proper pressure by the diaphragm spring 7 is maintained when the clutch is brought into engagement.

Figure 9:
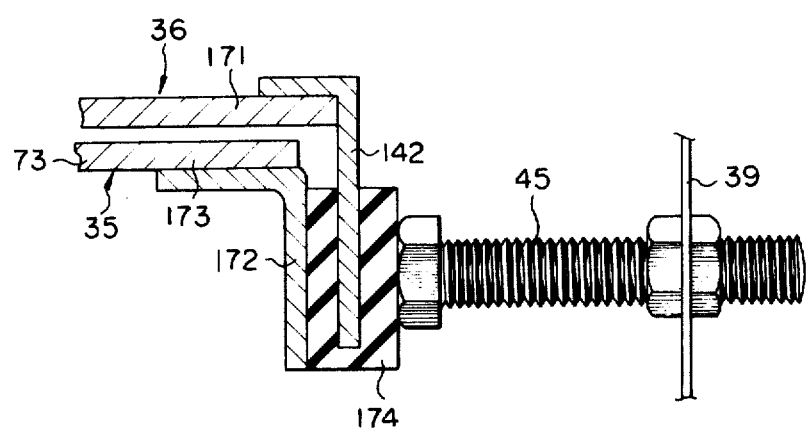
FIG. 9 is an enlarged cross sectional view taken along the line IX—IX of FIG. 7.

FIG. 9 illustrates the essential part of the device of FIGS. 7 and 8, namely, the peripheral portion of the engaging portion 142 of the second clutch pedal member 36. The engaging portion 142 is integrally secured to the body 171 of the second clutch pedal member 36 at the terminal point on the return stroke of the pivotal movement of the second clutch pedal member 36 in a manner to extend vertically with respect to the body 171. Another engaging portion 172 is integrally attached to the body 173 of the first clutch pedal member 35 at the terminal point on the return stroke of the pivotal movement of the first clutch pedal member 35 in a manner to extend vertically with respect to the body 173. The engaging portions 142 and 143 and the pedal stopper 45 are all made of metal. A resilient member 174 is attached to the engaging portion 142.

Thus, the engagement of the engaging portion 142 of the second clutch pedal member 36 with the pedal stopper 45 and the engagement of the engaging portion 172 of the first clutch pedal member 35 with the engaging portion 142 of the second clutch pedal member 36 are achieved through the medium of the resilient member, at the terminal stage of the return stroke of the clutch pedal 33, thereby preventing generation of abnormal sound.

According to the third embodiment of the present invention, generation of abnormal sound is prevented by the resilient member 172 attached to the engaging portion 142 of the second clutch pedal member 36.

Figure 10:
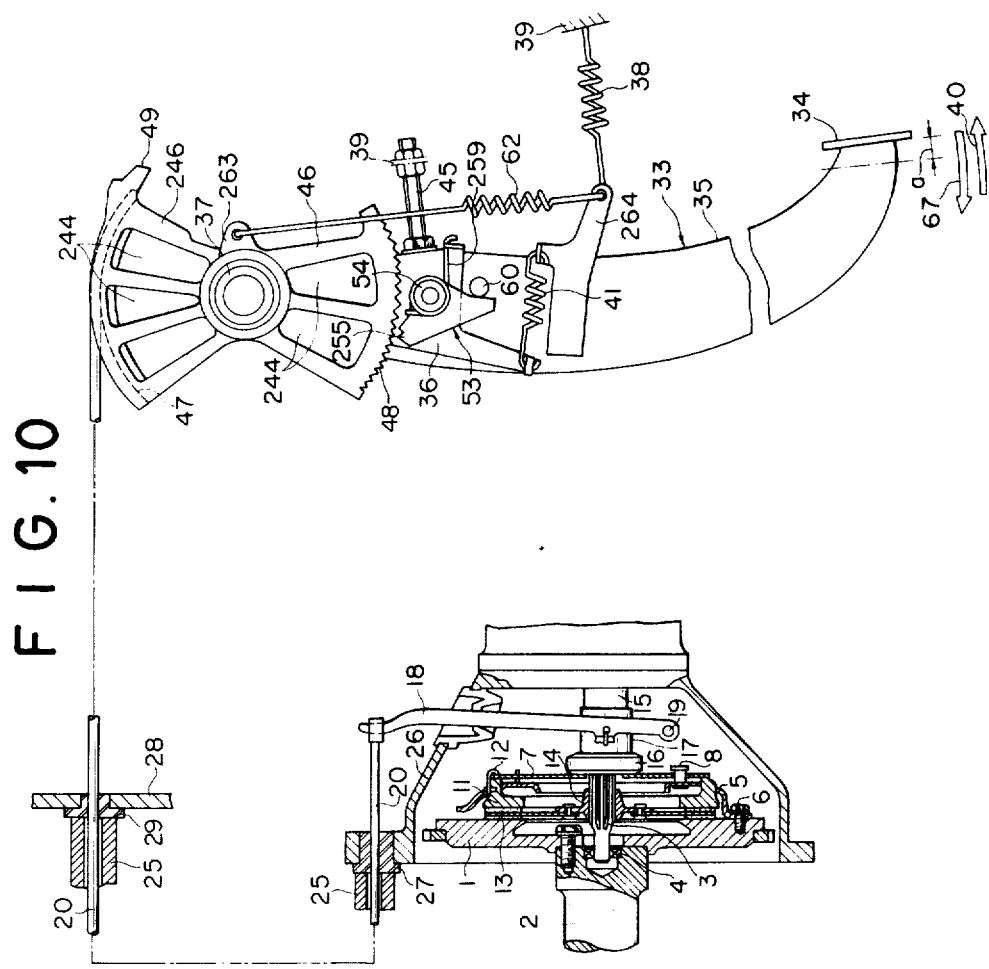
FIG. 10 is a modified cable-type clutch release device comprising a means for preventing the stagger in engagement of a pawl with a clutch tooth, according to the present invention.
Figure 11:
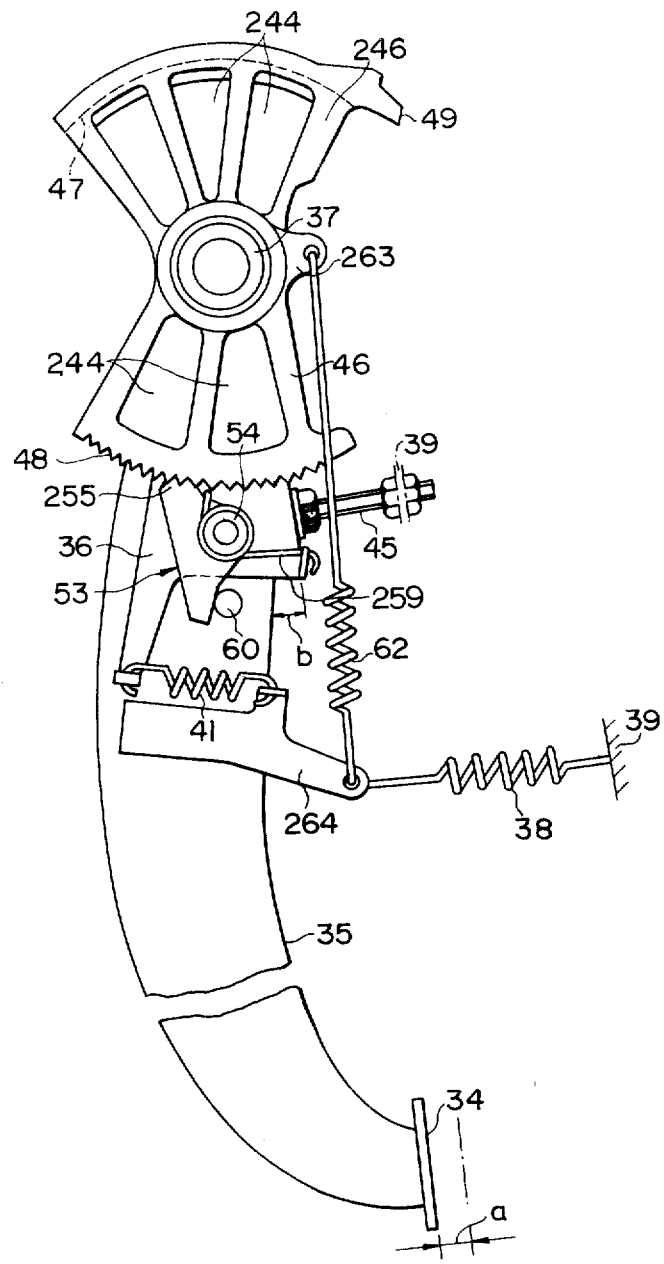

FIGS. 10 and 11 illustrate a cable-type clutch release device including means for preventing the stagger in engagement of the pawl with a ratchet tooth. The clutch release device according to this embodiment is the same in structure and operation as those of the device of FIG. 1, with the exception of some points. The differences are such that a sector member 246 is provided with cuts 244, without losing a strength required; a pawl 255 is of a saw blade shape; a point at which the torsion spring 259 is attached to the second clutch pedal member 36 lies on the pedal stopper side of the second clutch pedal member 36; a lug 263 of the second clutch pedal member 36 is located in the proximity to the pedal boss 37; and the springs 38 and 62 are secured at one ends thereof to the same point on the lug 264 of the first clutch pedal member 35. The clutch release operation of the device is quite the same as that of the device of FIG. 1, and hence no description is given herein.

Figure 12:
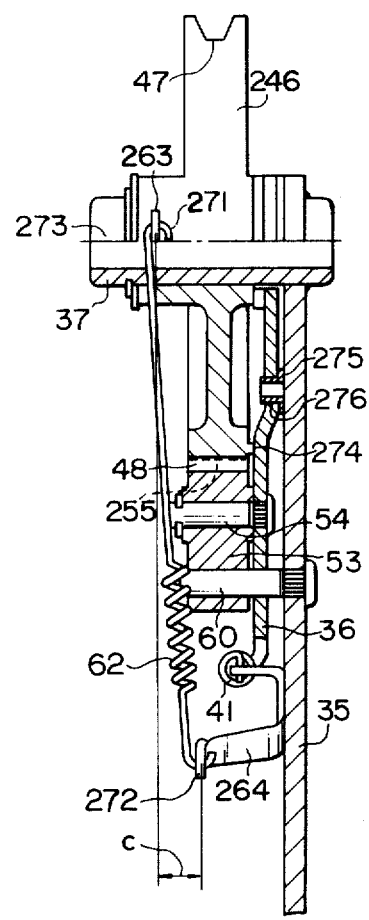
FIG. 12 is an enlarged cross sectional view of the essential part of the device of FIG. 10.

FIG. 12 illustrates in detail the means for preventing stagger in engagement of the pawl member with a ratchet tooth in the device of FIG. 10. The spring 62 is confined between the points 271 and 272 in the lug 263 of the sector member 246 and in the lug 264 of the first clutch pedal member 35. The points 271 and 272 are displaced from each other by a distance c in a direction of the central axis 273 of the pedal boss 37. A raised portion 274 raised by a given size in the direction of the central axis is formed on the side surface of the ratchet member which faces the second clutch pedal member 36 in the vicinity of the ratchet 48 of the sector member 246. A bushing 276 having a flange 275 of a given thickness in the direction of the central axis is attached to the second clutch pedal member 36, with the flange 275 located on the clutch pedal side 35 with respect to the second clutch pedal member 36.

The sector member 246 and the first clutch pedal member 35 are pressed against each other under the central axis 273 by the spring 62 secured at the opposite ends thereof displaced from each other. A distance between the sector member 246 and the second clutch pedal member 36 in the direction of the central axis 273 and a distance between the first and second clutch pedal members 36 and 35 are defined by the raised portion 274 and the flange 275, respectively, whereby the sector member 246 is properly located in the direction of the central axis 273, as well as the second clutch pedal member 36 and the first clutch pedal member 35 are located in proper positions, respectively. Engagement of the pawl 55 with one of the ratchet teeth 48 is accurately achieved, without being staggered in the direction of the central axis 273.

According to this embodiment, the spring 62 acts to press the sector member 246 and the first clutch pedal member 35 against each other in the direction of the central axis 273, and the raised portion 274 and the flange 275 act to locate the sector member 246, the second clutch pedal member 36 and the first clutch pedal member 35 properly in the direction of the central axis, thus eliminating the stagger in the direction of the central axis in engagement of the pawl with the ratchet 48.

What is claimed is:

1. In a cable-type clutch release device for a usually contacting-type clutch, which includes; a clutch disc disposed between a fly wheel and a pressure plate; a diaphragm spring for urging the clutch disc against the fly wheel through the medium of the pressure plate; a release bearing normally contacting the diaphragm spring; a release fork for adjusting an axial position of the release bearing; and a cable connected at one end thereof to the release fork; the improvements comprising:
    a first clutch pedal member pivotally supported and having a pedal pad at the lower end thereof;
    a second clutch pedal member supported pivotally about the axis of rotation of said first clutch pedal member;
    a first spring for biasing said first clutch pedal member in a direction of a return movement thereof;
    a second spring for biasing said second clutch pedal member in a direction of the return movement thereof;
    a stopper for limiting the return movements of said first and second clutch pedal members;
    a ratchet member having ratchet teeth and supported pivotally movably about the axis of rotation of said first clutch pedal member, said ratchet member being connected to one end of the cable;
    a pawl member having at one end thereof a pawl engageable with one of said ratchet teeth and pivotally supported on said second clutch pedal member;
    a third spring for biasing said pawl member in a direction to disengage the pawl from the ratchet tooth of said ratchet teeth of said ratchet member; and
    an engaging member provided on said first clutch pedal member and engageable with the other end of said pawl member.

2. A cable-type clutch release device as defined in claim 1, wherein said second spring is a tension spring secured at the opposite ends thereof to predetermined points in said first and second clutch pedal members, respectively.

3. A cable-type clutch release device as defined in claim 1, wherein said second spring is a torsion spring secured at the opposite ends thereof to predetermined points in said first and second clutch pedal members, respectively.

4. A cable-type clutch release device as defined in claim 2 or 3, wherein said first spring is a tension spring secured at the opposite ends thereof to said first clutch pedal member and a body vehicle, respectively.

5. A cable-type clutch release device as defined in claim 4, further comprising; a tension spring for preventing the cable from being slackened, said tension spring being secured at the opposite ends thereof to said first clutch pedal member and said ratchet member, respectively.

6. A cable-type clutch release device as defined in claim 5, wherein a cable guide is provided in said ratchet member.

7. A cable-type clutch release device for a normally contacting-type clutch comprising:
    a diaphragm spring for pressing a clutch disc serving as one clutch member to be connected against the other clutch member through the medium of a pressure plate;
    an axially moveable release bearing usually contacting said diaphragm spring;
    a clutch pedal which adjusts the axial position of said release bearing by way of a cable and which includes first and second clutch pedal members each being rotatable about a common axis;
    a ratchet member pivotally moveable about said common axis and being connected to one end of said cable proximate said clutch pedal, and having ratchet teeth;
    a pawl member having at one end thereof a pawl engageable with one of said ratchet teeth of said ratchet member and pivotally supported on said second clutch pedal member;
    an engaging member secured to said first clutch pedal member and engageable with the other end of said pawl member;
    said second clutch pedal member having two engaging surfaces, one being disposed for engagement with a stopper of a vehicle body and the other being disposed for engagement with one side of said first clutch pedal member; and
    a one-piece resilient member attached to the engaging surfaces of said second clutch pedal member for cushioning contact between said second clutch pedal member and stopper and between said second clutch pedal member and said first clutch pedal member.

8. A cable-type clutch release device including:
    a first clutch pedal member having a pedal pad at the lower end thereof;
    a ratchet member having ratchet teeth and being connected to one end of a cable for transmitting movement of said first clutch pedal member to the clutch;
    a second clutch pedal member pivotally movably supporting a pawl member having a pawl engageable with one of the ratchet teeth of said ratchet member and controlling connection of said first clutch pedal member with said ratchet member;
    said first and second clutch pedal members and said ratchet member being supported for pivotal movement about a common axis, said second clutch pedal member being disposed axially between said first clutch pedal member and said ratchet member;

a spring for preventing the slackening of the cable being attached at one end to said ratchet member and at the other end to said first clutch pedal member; and spacer means for retraining a predetermined distance between said ratchet member and said second clutch pedal member and between said second clutch pedal member and said first clutch pedal member.

9. A cable-type clutch release device as defined in claim 8, wherein said spacer means for retaining a distance in the direction of the axis of pivotal movement between the ratchet member and the second clutch pedal member at a given value is a raised portion formed on the side surface of said ratchet member which faces the second clutch pedal member.

10. A cable-type clutch release device as defined in claim 9, wherein said spacer means for retaining a distance in the direction of axis of pivotal movement between said first clutch pedal member and said second clutch pedal member is a bushing attached to said second clutch pedal member.

11. A cable-type clutch release device as defined in claim 10, wherein said bushing has a flange of a predetermined thickness, said flange serving to fulfil a major function as the spacer means.

* * * * *